(12) United States Patent
Richter

(10) Patent No.: US 7,034,439 B2
(45) Date of Patent: Apr. 25, 2006

(54) PIEZO-ELECTRIC DRIVE AND ITS USE FOR DRIVING HEAVY LOADS

(75) Inventor: Hans Richter, Augsburg (DE)

(73) Assignee: Gealan Formteile GmbH, Oberkotzau (DE)

( * ) Notice: Subject to any disclaimer, the term of this patent is extended or adjusted under 35 U.S.C. 154(b) by 204 days.

(21) Appl. No.: 10/679,942

(22) Filed: Oct. 6, 2003

(65) Prior Publication Data

US 2004/0140736 A1    Jul. 22, 2004

Related U.S. Application Data

(63) Continuation-in-part of application No. PCT/DE02/01270, filed on Apr. 8, 2002.

(30) Foreign Application Priority Data

Apr. 6, 2001 (DE) ............................... 101 17 465

(51) Int. Cl.
*H02N 2/00* (2006.01)

(52) U.S. Cl. .................. 310/328; 310/311; 310/323.01

(58) Field of Classification Search ................ 310/328, 310/311, 323.01–323.06

See application file for complete search history.

(56) References Cited

U.S. PATENT DOCUMENTS

| 5,039,900 | A | * | 8/1991 | Nashiki et al. | .............. 310/328 |
| 5,144,187 | A | * | 9/1992 | Culp | .......................... 310/328 |
| 6,150,750 | A | * | 11/2000 | Burov et al. | ................. 310/328 |

FOREIGN PATENT DOCUMENTS

| EP | 0424609 A1 | * | 6/1990 |
| JP | 60-204272 | * | 10/1985 |
| JP | 61-022776 | * | 1/1986 |
| JP | 09-275689 | * | 10/1997 |

* cited by examiner

*Primary Examiner*—Thomas M. Dougherty
(74) *Attorney, Agent, or Firm*—Klaus J. Bach

(57) ABSTRACT

In a piezoelectric drive comprising clamping piezo packets which are adjacently arranged, under compressive prestress, between a reference part and an output part, the reference part is connected to the clamping piezo packets by means of a "semi-rigid" bridging plate, which adapts in a flexible manner to differences in stack height of the piezo packets, in a static state but remains essentially rigid in a dynamic state, that is, at the operating frequency of the drive.

2 Claims, 3 Drawing Sheets

PIEZO-ELECTRIC DRIVE AND ITS USE FOR DRIVING HEAVY LOADS

Figure 1:
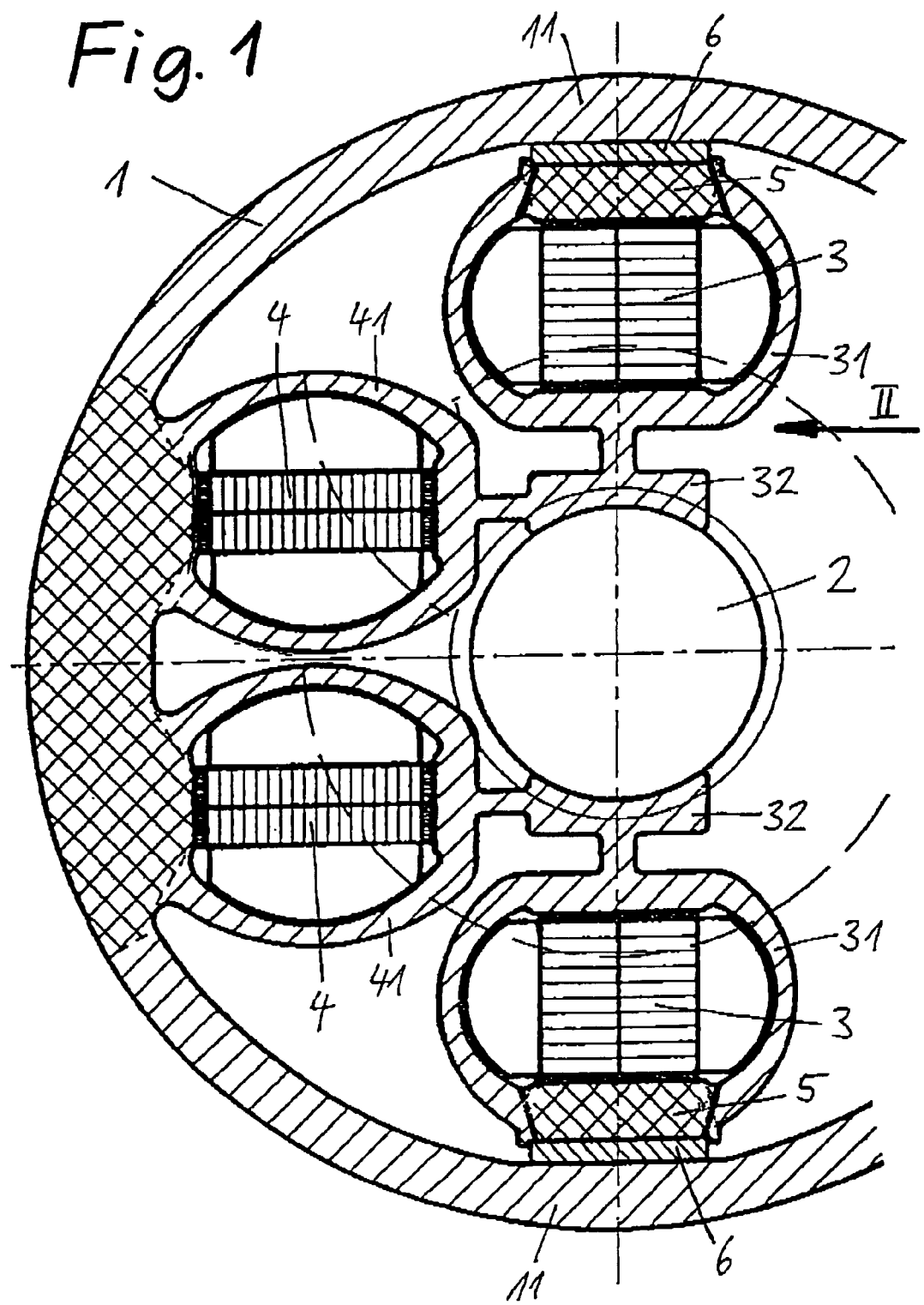

This is a Continuation-in-Part application of international application PCT/DE02/01270 filed Apr. 8, 2002 and claiming the priority of German application 101 17 465.9 filed Apr. 6, 2001.

BACKGROUND OF THE INVENTION

The invention relates to a piezo electric drive, particularly for relatively high drive forces or, respectively, drive power.

Such a piezo-electric drive may be used as a rotary drive wherein a relative rotational movement between a reference part and a drive part is generated as well as a linear drive wherein a linear or quasi-linear displacement movement between a reference part and an output part is generated.

The main field of use of the invention is its use as a control drive wherein high operating forces must be generated for example for the actuation of vehicle brakes.

The basic concept of such a piezo electric drive is disclosed, for example, in DE Gebrauchsmuster 94 19 802.

The basic design features of such a piezo electric actuator comprises a number of piezo packets in the form of stacks of piezo elements, which are arranged between a reference part and a drive part in such a way that the height of the stack of the piezo element extends normal to the surface of the drive part and to the direction of the relative movement between the reference part and the drive part. These stacks of piezo elements are adapted to provide selectively a clamping force between the reference part and the drive part and will therefore below be called clamping piezos. These clamping piezos are supported with one end (the term end refers to the piezo element stack arrangement) on the reference part and engage, with the other end, the drive part without being connected thereto. The orientation of the row in which these clamping piezos are arranged next to each other extends transverse to the relative movement between the drive part and the reference part.

Additional stacks of piezo elements in the form of piezo packets, which, because of their function will below be called stepping piezos, are provided so that they are oriented in the stack height direction about normal to the stack height direction of the clamping piezos and in the direction of the relative movement between the reference part and the drive part. These stepping piezos are also connected with one of their ends to the reference part and with their other end to that end of a clamping piezo which engages the drive part or to a sub-group of clamping piezos.

There are two groups of clamping piezos and two groups of stepping piezos. They are electrically controlled in such a way that, at a time, one group of clamping piezos is activated, that is, electrically energized so as to be expanded and this clamping piezos then engage the drive part in a clamping fashion while the other group of clamping piezos is de-activated, that is, in a release position, in which they do not engage the drive part. Then, the group of stepping piezos associated with the clamping piezo group, which is in a clamping state, is activated so that the respective stepping piezos expand and move thereby the ends of the clamping piezos, which are in engagement with the drive part, a certain distance in the direction of movement of the drive part. As a result, the drive part is advanced by a corresponding distance relative to the clamping piezos of the other clamping piezo group, which are in a release position. Then the control is switched over that is the clamping piezos which were previously engaged are now released as well as the associated stepping piezos so that the earlier clamping piezos return from their clamping position to their original positions whereas, at the same time, the other group of clamping piezos which were previously in the release position are activated and switched to the clamping position. Then also their stepping piezos are activated. In this way, the two groups of clamping piezos generate together with the respective associated stepping piezos by their alternating activation a continuous series of steps whereby the drive part is moved in a stepwise fashion. Since the control of the piezos is in the frequency range of several kilohertz, for example 25 kHz, a quasi-continuous movement of the drive part is obtained relative to the reference part.

The presentation above represents the theory of the operating mechanism. The design principles of a piezoelectric drive as described above however has been found to be not yet practically usable.

The movements obtained in this way are extremely small. The available expansion length of a piezo packet is about 1% of the stack height. With a stack height of the clamping piezos of about 10 mm, as a result, an expansion length of about 10 μm can be achieved. On the other hand, the tolerances of the mechanical components of the drive even with high-precision manufacturing techniques are in the range of hundreds of a millimeter. Also, the stack height of the piezos is subject to manufacturing tolerances so that, in a row of piezos arranged in side-by-side relationship, all the piezo stacks have a different height within these tolerances. It has to be taken into consideration that the expansion length of the clamping piezos, assuming a range of about 10 μm, is in the roughness-depth range of mechanically worked surfaces of work pieces. As a result, the arrangement requires that the clamping piezos are held between the reference part and the drive part under tension, to be operative, since otherwise, with the available expansion length, the necessary clamping force and consequently, the needed friction force for moving the drive part cannot be achieved. Of course, the clamping piezos do not need to engage the drive part directly but they may engage the drive parts by way of an engagement shoe.

It is the object of the invention to provide an operative arrangement of a piezoelectric drive of the type described above.

SUMMARY OF THE INVENTION

In a piezoelectric drive comprising clamping piezo packets which are adjacently arranged under compressive prestress between a reference part and an output part, the reference part is connected to the clamping piezo packets by means of a "semi-rigid" bridging plate, which adapts in a flexible manner to differences in stack height of the piezo packets in a static state but remains essentially rigid in a dynamic state, that is, at the operating frequency of the drive.

It is essential for the practical arrangement and operability of such a piezo-electric drive that the clamping piezos are supported with one end thereof on a semi-rigid bridge, which is common to all the clamping piezos of the row of clamping piezos, but engage, with their other ends, a rigid bridge wherein the semi-rigid or, respectively, rigid bridge may be arranged at the reference part and also on the drive part.

The importance of this arrangement and the operating mechanism according to the invention achieved thereby is expediently described in detail below on the basis of an example with reference to the accompanying drawings.

BRIEF DESCRIPTION OF A THE DRAWINGS

Figure 2:
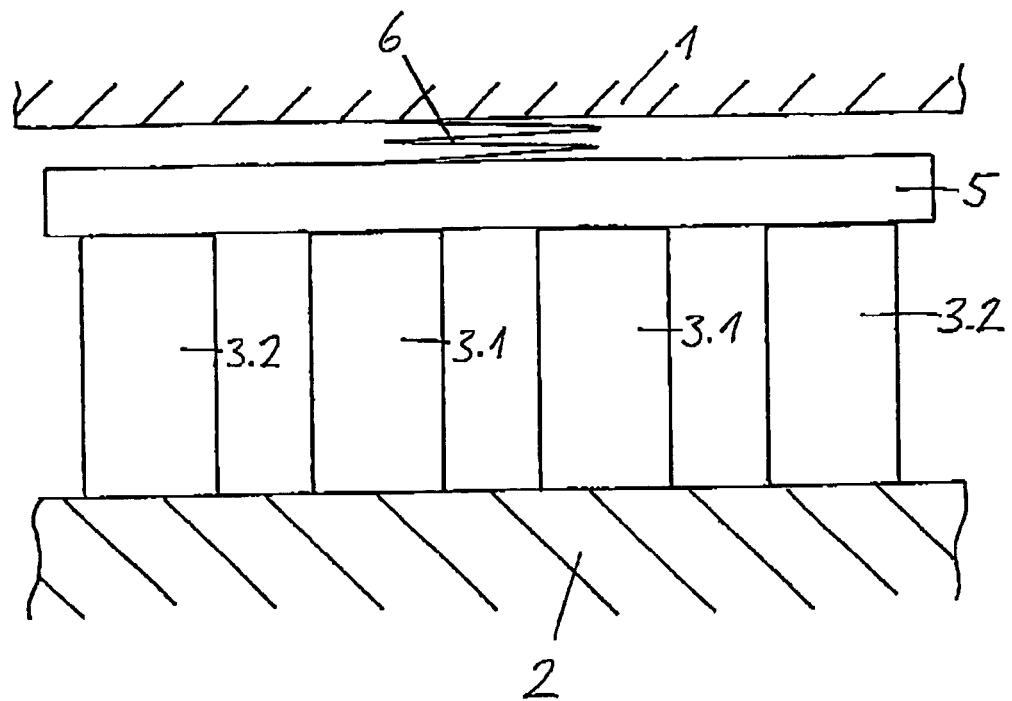
Figure 3:
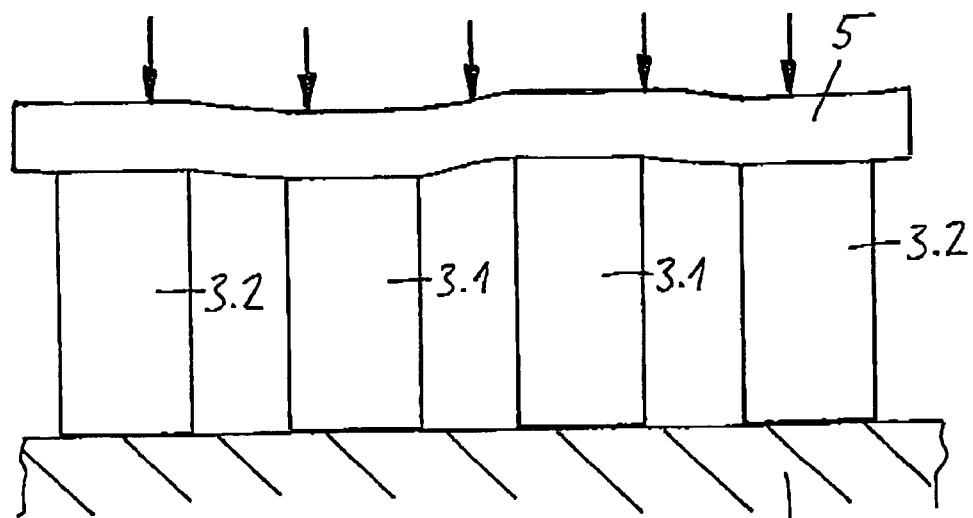
Figure 4:
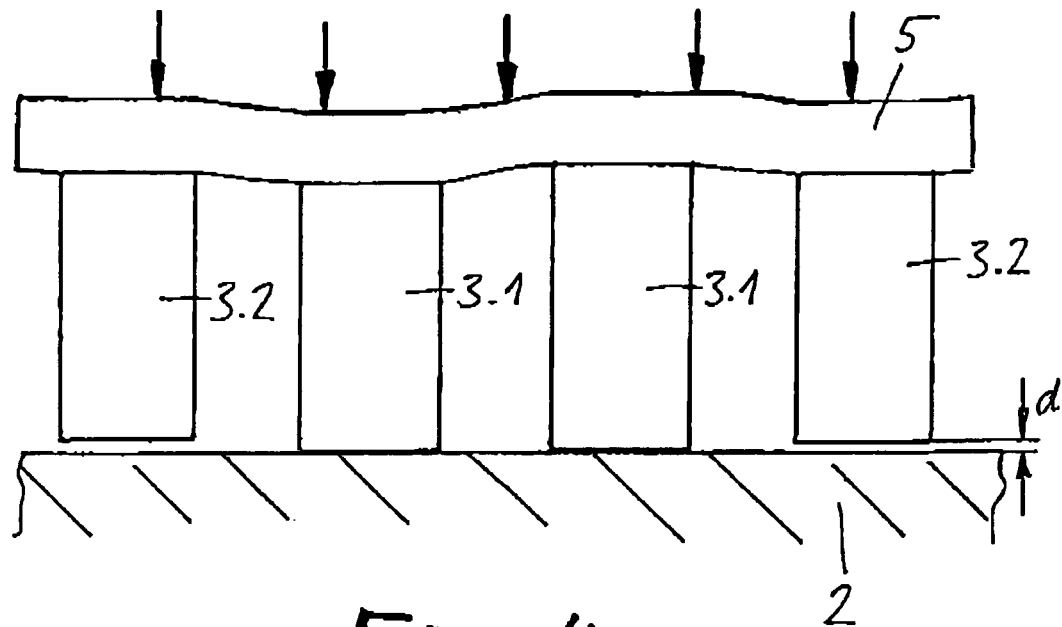
Figure 5:
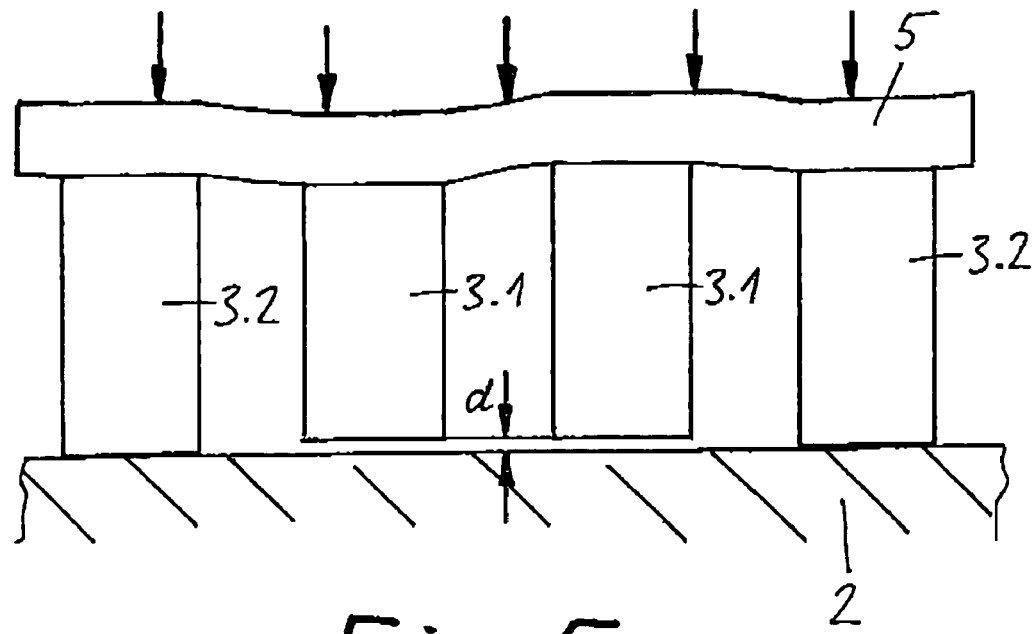

FIG. 1 is a schematic side view of a piezo-electric drive according to the invention, FIG. 2 is a schematic representation of a piezo electric drive showing the principle of the drive as seen in the direction of the arrow II in FIG. 1, FIG. 3 shows in a highly exaggerated manner the arrangement of FIG. 2 in the rest position of the drive, FIG. 4 shows, in a highly exaggerated representation, the arrangement of FIG. 2 upon activation of one of the clamping groups, and FIG. 5 shows, in a highly exaggerated representation, the arrangement according to FIG. 2 upon activation of the other clamping piezo group.

DESCRIPTION OF A PREFERRED EMBODIMENT

FIG. 1 shows the basic design of a piezo-electric drive as it was described earlier on the basis of a rotary drive, which could be used for the operation of a motor vehicle brake and could develop a torque of for example 30 Nm. However, particulars in this respect are not shown and will be also not be described at this point.

In accordance with FIG. 1, the drive consists of a stator 1 which forms the reference part, and a rotor 2, which forms the drive part and the piezo mechanism arranged therebetween. The piezo mechanism comprises a number of clamping piezos 3 and a number of stepping piezos 4. The clamping piezos 3 are each tightly engaged between a respective individual tensioning yoke 31 with a clamping shoe 32 integrally formed with the tensioning yoke 31 and a bridging plate 5. The bridging plate 5 is supported, under tight preferably axial prestress, by a schematically shown spring element 6 on a counter element 11 of the stator 1 and the shoe 32 of each clamping piezo 3 abuts the rotor 2 so that the whole arrangement comprising the bridge plate 5, the clamping piezos 3 and the respective clamping yokes 3 with the shoes 32 is tightly engaged between the counter element 11 of the stator 1 and the rotor 2.

The stepping piezos 4 are contained in a clamping cage 41 provided individually for the respective stepping piezo 4. With its front end, the clamping cage 41 is connected to the shoe 32 of an associated clamping piezo 3 and with its rear end the clamping cage is connected integrally, or in a form-locking manner, to a carrier element 12 of the stator 1 which carrier element 12 is common to all stepping piezos. The arrangement as shown in FIG. 1 is, as apparent, a symmetrical double arrangement with two symmetrically arranged piezo mechanisms of which one is shown arranged in the upper half of the drawing and the other in the lower half of the drawing. Accordingly, the rotor 2 is disposed between two diametrically opposite rows of clamping piezos 3 with associated stepping piezos 4 so that the clamping forces generated by the two piezo mechanisms act symmetrically between the stator 1 and the rotor 2 and the support structure for the rotor 2 is therefore not subjected to a one-sided loading.

It is also apparent from FIG. 1 that, expediently, the clamping piezos 3 and have a shorter stack height and a larger width so that they are stronger than the stepping piezos 4, which have a greater stack height and smaller width. As a result, such an arrangement provides for large clamping forces in combination with relatively long steps.

FIG. 2 shows now, in principle, the clamping piezo arrangement as seen in FIG. 1 in the direction of arrow II.

Shown are a row of four clamping piezos (3.1 and, respectively 3.2), the bridge plate 5, the stator element 11, the compression spring 6 (highly simplified) which is effective between the stator element 11 and the bridge plate 5, and the rotor 2. The row of clamping piezo comprises at least three clamping piezos in order to generate a symmetrical clamping force. If three clamping piezos are provided the center clamping piezo should be twice as wide or, respectively, twice as strong as the two outer clamping piezos in order to provide for uniform forces also when alternatingly the outer clamping piezos or the inner clamping piezo are activated. In the arrangement as schematically shown in FIG. 2, the center piezo is divided symmetrically into two individual piezos so that there are four piezos, that is a group of two inner piezos 3.1 and a group of two outer piezos 3.2. The clamping yokes 31 and shoes 32 shown in FIG. 1 are not considered in the representation of the principle according to FIG. 2, that is, respectively, they are considered to be a part of the respective clamping piezos.

FIG. 3 shows now the basic arrangement according to FIG. 2, in a highly exaggerated representation in a resting state of the drive. The missing support of the bridge plate 5 is symbolized in this representation by arrow-marked forces effective thereon. The four clamping piezos are shown differently high which is intended to indicate manufacturing tolerances. The bridge plate 5, which has a corresponding internal elasticity adapts under the pre-tensioning pressure effective thereon to the wavy contour of the row of clamping piezos which is generated thereby and which is shown in a highly exaggerated manner. FIG. 3 shows the arrangement in a rest position that is with all clamping piezos deactivated, that is not expanded.

The bridge plate 5 is the component which was called earlier semi-rigid bridge, wherein the expression semi-rigid means that this Bridge plate 5 is capable of adapting to the wavy contour of the various clamping plates as caused by the tolerances so that it abuts snugly all the clamping piezos that is to adapt the configuration shown in FIG. 3 in an exaggerated manner. The drive part 2, that is, the rotor 2 in the embodiment of FIG. 1, forms the element which was called above the "rigid bridge", that is, it is so rigid in itself that it will not assume a configuration or adapt as the "semi-rigid" bridge plate 5 does.

If the drive is activated first all the clamping piezos are energized so that they expand as a result, and move the bridge plate 5 by a corresponding distance of for example $\frac{1}{10}$ of a millimeter away from the drive part 2. The waviness shown in FIG. 3 however remains essentially unchanged. Then follows the alternating activation of a group of clamping piezos at a time, wherein the activation of one group slightly overlaps that of the other, so that, at the switch-over point, all four clamping piezos are energized.

FIG. 4 shows in a manner analog to FIG. 3, the situation when one of the groups of clamping piezos with the clamping piezos 3.1 is activated and the two outer clamping piezos 3.2 of the outer group of clamping piezos are deactivated.

Accordingly, in the situation as shown in FIG. 4 only the two inner clamping piezos 3.1, which are energized and expanded, support, whereas the deactivated and therefore not expanded outer clamping piezos 3.2 are disengaged and apply no clamping force on the drive part 2. This is indicated in FIG. 4 by a visible gap, whose width is indicated by the distance d. Actually, in practice, this gap d is so small that the "semi-rigid" bridging plate 5 would soon again close this gap in a static state by corresponding bending.

FIG. 5 then shows the situation during activation of the two outer clamping piezos 3.2 and, the deactivation of the inner clamping piezos 3.1, wherein only the outer clamping piezos 3.2 are expanded and support the bridging member 5 whereas the two inner clamping piezos 3.1 are not expanded and again lifted off the drive unit 2 by the distance d.

Since the piezo mechanism is operated in the kilohertz frequency range, for example with 25 kHz, the condition according to FIG. 4 or according to FIG. 5 lasts each over a period of almost 20 µs (corresponding about to a half wave of the control frequency since, as mentioned, there is a slight overlap at the switch-over point). In this way, a corresponding time window is defined, in which the deactivated clamping piezos are returned by the deactivation of the respective stepping piezos by the stepping distance and, at the same time, the respective supporting clamping piezos are advanced in stepping direction by means of the respective stepping piezos, whereby the drive part 2 can be moved ahead by a stepping distance. Only during this time window, wherein the one group of clamping piezos is non-supportive, the advance by the respective other clamping piezo group can be effected by the activation of the respective associated stepping piezos.

For the functioning of the electro-piezo drive during the transmission of large torques with, consequently, large clamping forces between the clamping piezos and the drive part 2, it is therefore absolutely necessary that no clamping forces are effective between the respective deactivated group of clamping piezos and the drive part 2 (but, it has to be taken into consideration that in the practical operation the semi-rigid bridging plate 5 may also be formed by the drive part and the other end of the piezos may be supported on the reference part, so that the kinematic reversal of the situation as described in FIGS. 4 and 5 can also be realized). This however means that, during this time window, the "semi-rigid" bridging plate 5 may not collapse in the area of the respective de-activated, that is non-engaging, clamping piezos to such an extent that these deactivated piezos firmly engage the drive part 2. Rather, the rigidity of the bridging plate 5 must be so high that, in the time window, the distance d may be decreased but only partially so that a certain distance still remains.

Practical tests performed at an operating frequency of 25 kHz and a corresponding setup of the bridging plate 5 have shown that the bridging plate 5 collapses during the time window in the area of the inner clamping piezo by about 0.8 µm and in the area of the outer clamping piezo by about 1.2 µm.

With an insufficient rigidity of the bridging plate 5, the bridging plate would collapse excessively and with an excessive rigidity the bridging plate would prevent a uniform support of all of the activated clamping piezos.

It is highly critical for the operation of the piezoelectric drive that the bridging plate 5 is properly dimensioned and shaped. The bridging plate 5 should keep the shape, which it has in the rest position (FIG. 3) essentially also during operation (see FIGS. 4 and 5), since the bridge plate 5 should not be subjected to substantial bending vibration.

For the dimensioning of the bridge plate 5 needed in accordance with the criteria described above the following parameters must be taken into consideration:
the elasticity modulus of the material of which the bridge consists,
the operating frequency of the piezo drive since, at the operating frequency of the piezo drive, the bridging plate 5 should remain essentially stiff, but should, in a static state, have the flexibility needed for adaptation,
the transverse distances of the clamping piezos.

With a stack height of the clamping piezos of about 10 mm an expansion length of the clamping piezos of about 10 µm is obtained. With a static flexibility of the bridging plate 5 between the individual clamping piezos by about 14–15 µm and a dynamic behavior with a collapse by about 1 µm during the given time window over the non-activated clamping piezos a flawless motor operation can be obtained.

The invention is also suitable for heavy load drives, that is, for example, for the wheel drive of tanks or similar vehicles where high torques must be generated.

The invention claimed is:

1. A piezo-electric drive, comprising a reference part (1) and a drive part (2), a plurality of packets of clamping piezos (3) arranged side-by-side in the form of first stacks of piezo elements disposed between said reference part (1) and said drive part (2) in a pre-compressed state, and engaging said drive part (2) via a clamping shoe (32) a stepping piezo packet (4) connected to said clamping shoe and including second stacks of piezo elements with a stacking direction extending about normal to the stacking direction of the clamping piezo packets (3) so as to be oriented in the direction of the relative movement between the reference part (1) and the drive part (2), said reference part (1) being a common "rigid" support component and at least said packets of clamping piezos (3) being supported in a pre-compressed state on the reference part (1) by a bridging plate (5) which is "semi-rigid", so as to accommodate in a static state stack height differences of the individual clamping piezo stacks in a bending-elastic manner, but, in a dynamic state at the given operating frequency, is essentially rigid and during a period, in which in each case one group of clamping piezo stacks is electrically de-activated and not expanded and the other group of clamping piezo stacks is electrically activated and expanded, yields under the pre-compression pressure by only a fraction of the piezo expansion length.

2. A piezo-electric drive according to claim 1, wherein the "semi-rigid" bridging plate (5) engages the reference part (1) under the pre-compression pressure in a resilient manner and the free ends of the clamping piezo stacks (3) engage the drive part (2).

* * * * *